United States Patent Office 3,387,026
Patented June 4, 1968

3,387,026
CATALYTIC METHOD OF PREPARING
KETO-ACIDS
Harry Chafetz, Poughkeepsie, and Theodore C. Mead, Glenham, N.Y., assignors to Texaco Inc., New York, N.Y., a corporation of Delaware
No Drawing. Filed Sept. 24, 1964, Ser. No. 399,108
4 Claims. (Cl. 260—514)

ABSTRACT OF THE DISCLOSURE

A process of producing keto-monocarboxylic acids via selective oxidation of alpha-hydrocarbon substituted cyclohexanone in the presence of alkali metal fluoride catalyst, said acids being useful as starting reactants in the preparation of keto-acid ester, amide and N-substituted amide derivatives, the latter being useful as detergent dispersant additives for lubricating oils.

---

This invention pertains to a method of preparing keto-acids from cycloalkanones. More particularly, it is directed to a process of producing keto-monocarboxylic acids via selective oxidation of alpha-hydrocarbon substituted cyclohexanone in the presence of an alkali metal fluoride catalyst selected from the group consisting of potassium fluoride, lithium fluoride, cesium fluoride and rubidium fluoride.

The keto-carboxylic acids prepared by the method of the invention are useful as starting reactants in the preparation of keto-acid esters, amides and N-substituted amides. These latter keto-acid derivatives are useful as detergent-dispersant additives for lubricating oils, particularly when in combination with aromatic sulfonate.

In the past, the keto-acids contemplated herein have been prepared by heating alpha-alkylcyclohexanones in the presence of chromic oxide and sulfuric acid. Although this past method is effective in producing the keto-acids, it has the undesirable aspect of producing the keto-acid product in relatively low yields and requiring expensive equipment and special handling for the highly corrosive chromic oxide-sulfuric acid combination.

We have discovered and this constitutes our invention a catalytic method of producing a keto-acid in relatively high yields utilizing a catalyst which is essentially non-corrosive and which requires no special handling techniques or relatively expensive equipment. More particularly, we have discovered a method of preparing a keto-acid of the general formula:

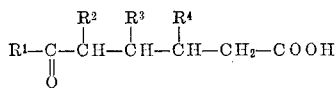

where $R^1$ is a hydrocarbon radical selected from the group consisting of alkyl, cycloalkyl, aryl, akaryl and aralkyl of from 1 to 8 carbons and $R^2$, $R^3$ and $R^4$ are members selected from the group consisting of hydrogen, alkyl, cycloalkyl, aryl, alkaryl and aralkyl of from 1 to 8 carbons and wherein at least two of said $R^2$, $R^3$ and $R^4$ members are hydrogen, comprising contacting a cyclohexanone of the formula:

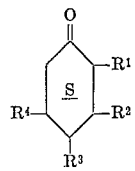

where $R^1$, $R^2$, $R^3$ and $R^4$ are as heretofore defined, with an oxygen containing gas in the presence of between about 0.05 and 5 wt. percent alkali metal fluoride catalyst selected from the group consisting of potassium fluoride, lithium fluoride, cesium fluoride and rubidium fluoride at a temperature between about 125 and 225° C. The oxygen rate utilized in the procedure is advantageously between about 500 and 1200 liters oxygen/liter reaction mixture/ hour. The oxygen contact is normally continued for a period of between about 4 and 8 hours. The formed keto-acid product can be recovered from the reaction mixture by standard means such as fractional distillation.

Specific examples of the cyclic ketone reactants contemplated herein are 2-methylcyclohexanone, 2-isopropyl-3-methylcyclohexanone, 2-phenylcyclohexanone, 2-tolyl-cyclohexanone, 2-benzylcyclohexanone, 2-butyl-4-phenyl-cyclohexanone, 2-butyl-5-benzylcyclohexanone, 2-phenyl-5-tolylcyclohexanone and 2-cyclohexylhexanone. Corresponding keto-acid products are 6-oxoheptanoic acid; 5,7-dimethyl-6-oxooctanoic acid; 6-phenyl-6-oxohexanoic acid; 6-(p-tolyl)-6-oxohexanoic acid; 7-phenyl-6-oxoheptanoic acid; 4-phenyl-6-oxodecanoic acid; 3-benzyl-6-oxodecanoic acid; 3 - (p-tolyl) - 6 - phenyl-6-oxohexanoic acid and 6-cyclohexyl-6-oxohexanoic acid.

The oxygen containing gas may be any gas containing oxygen wherein the other ingredients are essentially inert in the oxidation reaction such as air, pure oxygen or oxygen diluted with an inert gas, e.g., nitrogen.

Although the use of solvent in the method of the invention is not essential, particularly where the cycloalkanone is liquid, solvent is advantageously employed where the cyclohexanone reactant is a solid in order to facilitate the contact between the oxygen and the cyclohexanone reactant. Any inert solvent may be employed having a dielectric constant above about 2.3 and which is liquid under the reaction conditions. Examples of operable solvents are inert liquid hydrocarbons of a dielectric constant above about 2.3 of a boiling point between 110° and 165° C., e.g., toluene, isooctane and xylene.

The following examples further illustrate the invention but are not to be construed as limitations thereof:

Example I

This example illustrates the method of the invention. The overall procedure employed was as follows:

To a 3-necked round bottomed flask of 500 mls. size fitted with a thermometer, water cooled condenser, fritted glass bubbler and ice water and dry ice traps placed after the condenser, there was added 2-methylcycohexanone and potassium fluoride or lithium fluoride. The reaction mixture was heated to and maintained at the desired temperature and the solution was magnetically stirred while oxygen was bubbled therethrough at a rate of 2.4 liters/ minute for a 5 hour period. At the end of the reaction period, the reaction mixture was fractionally distilled. The fraction recovered at between about 105 and 130° C. at 0.25 to 0.65 mm. Hg which crystallized on standing to a waxy solid of a melting point between about 30 and 35° C. was identified as 6-oxoheptanoic acid of the formula:

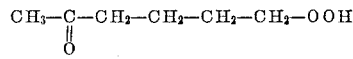

Literature values for 6-oxoheptanoic acid give a boiling point of 122–123° C./1 mm. Hg and a melting point of 34–35° C. The particular reaction conditions, reactants, catalyst quantities utilized and yields in several runs employing the foregoing overall procedure are set forth below in Table I:

TABLE I

| Run | A | B | C | D | E |
|---|---|---|---|---|---|
| 2-methylcyclohexanone, g | 200 | 190 | 200 | 200 | 200 |
| Catalyst | KF | KF | KF | KF | LiF |
| Catalyst, wt. g | 7 | [1] 0.1 | 1 | 7 | 7 |
| React. Temp., °C | 139 | 144 | 140 | 139 | 148 |
| Yield,[2] mole percent of 6-oxoheptanoic acid | 63 | 42 | 40 | 40 | 14 |

[1] Ketone saturated in KF at reaction temperature and filtered.
[2] Based on unrecovered cyclohexanone reactant.

Example II

This example further illustrates the method of the invention.

The overall procedure of Example I was employed, utilizing 255 grams of 2-cyclohexylhexanone, 2.5 grams potassium fluoride, a reaction temperature of 150° C., a reaction time of 5 hours and an $O_2$ rate of 4 liters/minute. The final reaction mixture was fractionally distilled and the fraction recovered at 164–181° C. at 1.5 mm. Hg in an amount of 50 grams which solidified into a waxy solid and when recrystallized once from petroleum ether had a melting point of 51° C. was identified as 6-cyclohexyl-6-oxohexanoic acid of the formula:

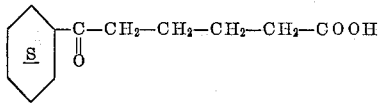

This product was recovered in a yield of 40 mole percent based on the unrecovered cyclohexylcyclohexanone reactant.

Example III

This example illustrates the materiality of various aspects of the method of the invention.

The overall procedure and apparatus of Example I were employed except conditions and reaction ingredients were varied. The oxygen rate employed was 2.4 liters/minute and the reaction time was 5 hours except in Run J the reaction time was 3.3 hours. The test data and results are reported below in Table II:

TABLE II

| Run | F | G | H | I | J |
|---|---|---|---|---|---|
| 2-methylcyclohexanone, g | 200 | 200 | 200 | 200 | ([1]) |
| Catalyst | None | NaF | KF | KF | KF |
| Catalyst, wt. grams | None | 7 | 20 | 7 | 1 |
| Reaction Temp., °C | 139–146 | 143–145 | 136 | 50–110 | 145 |
| Yield,[2] mole percent of 6-oxoheptanoic | <1 | <5 | 0 | 0 | 0 |

[1] 100 g. cyclohexanone substituted for methylcyclohexanone.
[2] Based on unrecovered methylcyclohexanone reactants.

As can be seen from the foregoing, the use of the contemplated fluoride catalyst is critical to the procedure of the invention since the employment of a closely related fluoride and no fluoride at all produced little or no keto-acid product. This is demonstrated by Runs F and G. Run H shows that catalytic contents of about 10 wt. percent fail to produce the keto-acid. Run I indicates the importance of the defined reaction temperatures in that a reaction temperature of 110° C. and below did not produce the keto-acid. In Run J no keto-acid was formed indicating the materiality of the cyclic ketone reactants as defined.

We claim:

1. A method of preparing a keto-acid of the formula:

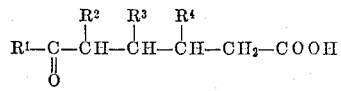

where $R^1$ is a radical selected from the group consisting of alkyl, aryl, alkaryl and aralkyl of from 1 to 8 carbons and $R^2$, $R^3$ and $R^4$ are members selected from the group consisting of hydrogen, alkyl, aryl, alkaryl and aralkyl of from 1 to 8 carbons where at least two of said members are hydrogen and where said alkyl, aryl, alkaryl and aralkyl in the radical group and members group are unsubstituted and consist solely of carbon and hydrogen, comprising contacting a cyclohexanone of the formula:

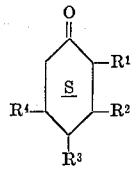

where $R^1$, $R^2$, $R^3$ and $R^4$ are as heretofore defined, with oxygen in the presence of between about 0.05 and 5 wt. percent of a catalyst selected from the group consisting of potassium fluoride, lithium fluoride, cesium fluoride and rubidium fluoride at a temperature between about 125 and 225° C. and recovering said keto-acid.

2. A method of preparing a keto-acid in accordance with claim 1 wherein said keto-acid is 6-oxoheptanoic acid, said cyclohexanone is 2-methylcyclohexanone, and said catalyst is potassium fluoride.

3. A method of preparing a keto-acid in accordance with claim 1 wherein said keto-acid is 6-oxoheptanoic acid, said cyclohexanone is 2-methylcyclohexanone and said catalyst is lithium fluoride.

4. A method in accordance with claim 1 wherein said keto-acid is 6-cyclohexyl-6-oxohexanoic acid, said cyclohexanone is 2-cyclohexylcyclohexanone and said catalyst is potassium fluoride.

References Cited

UNITED STATES PATENTS 2,316,543  4/1943  Amend _____ 260—514

LORRAINE A. WEINBERGER, *Primary Examiner.*

P. J. KILLOS, *Assistant Examiner.*